(12) United States Patent
Sekine (10) Patent No.: US 8,648,936 B2
(45) Date of Patent: Feb. 11, 2014

(54) IMAGE PROCESSING APPARATUS AND IMAGE PROCESSING METHOD

(75) Inventor: Hisato Sekine, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 340 days.

(21) Appl. No.: 13/152,746

(22) Filed: Jun. 3, 2011

(65) Prior Publication Data

US 2012/0002085 A1 Jan. 5, 2012

(30) Foreign Application Priority Data

Jul. 1, 2010 (JP) ................................. 2010-151435

(51) Int. Cl.
*H04N 5/217* (2011.01)
*H04N 5/225* (2006.01)
*H04N 5/228* (2006.01)
*G06K 9/40* (2006.01)

(52) U.S. Cl.
USPC ....... 348/241; 348/342; 348/208.99; 382/260

(58) Field of Classification Search
USPC ......................................... 382/255, 260–265
See application file for complete search history.

(56) References Cited

U.S. PATENT DOCUMENTS

| 5,879,284 A | 3/1999 | Tsujita | |
|---|---|---|---|
| 8,326,074 B2 * | 12/2012 | Feng et al. | 382/260 |
| 8,345,116 B2 * | 1/2013 | Minagawa | 348/222.1 |
| 2006/0023111 A1 * | 2/2006 | DeMenthon | 348/360 |
| 2008/0298678 A1 * | 12/2008 | Kang | 382/167 |
| 2010/0103309 A1 * | 4/2010 | Stern | 348/360 |
| 2010/0322530 A1 * | 12/2010 | Feng et al. | 382/260 |

FOREIGN PATENT DOCUMENTS

| JP | 10-165365 A | 6/1998 |
|---|---|---|
| JP | 2001-197354 A | 7/2001 |
| JP | 3532368 B2 | 5/2004 |

* cited by examiner

*Primary Examiner* — Timothy J Henn
*Assistant Examiner* — Pritham Prabhakher
(74) *Attorney, Agent, or Firm* — Fitzpatrick, Cella, Harper & Scinto (57) ABSTRACT

A recovery processing unit performs an image quality recovery processing of reducing a blur in an image using a filter to reduce a blur at an image height position for each image height on a line from the center position of the image to an end of the image.

8 Claims, 9 Drawing Sheets

CENTER
IMAGE HEIGHT
FOR WHICH BLUR RECOVERY FILTER IS HELD

FILTER COEFFICIENT

FIG. 5

BLUR RECOVERY FILTER

IMAGE HEIGHT

FIG. 6

| FOCAL LENGTH 16mm | | IMAGE HEIGHT | | | | |
|---|---|---|---|---|---|---|
| | | 01 | 02 | 03 | 04 | 05 |
| APERTURE | F2.8 | R111 | R112 | R113 | R114 | R115 |
| | F3.5 | R121 | R122 | R123 | R124 | R125 |
| | ... | ... | ... | ... | ... | ... |
| | Fxx | R1xx | ... | ... | ... | ... |

| FOCAL LENGTH 17mm | | IMAGE HEIGHT | | | | |
|---|---|---|---|---|---|---|
| | | 01 | 02 | 03 | 04 | 05 |
| APERTURE | F2.8 | R211 | R212 | R213 | R214 | R215 |
| | F3.5 | R221 | R222 | R223 | R224 | R225 |
| | ... | ... | ... | ... | ... | ... |
| | Fxx | R2xx | ... | ... | ... | ... |

IMAGE PROCESSING APPARATUS AND IMAGE PROCESSING METHOD

BACKGROUND OF THE INVENTION

1. Field of the Invention

The present invention relates to a technique of generating a higher-quality image by performing image processing to reduce blurs resulted from lens aberrations.

2. Description of the Related Art

Image degradation is known to occur when an object image captured by an image input apparatus such as a digital camera blurs more than actual due to the influence of aberrations of the lens and the like. A technique using the PSFs (Point Spread Functions) of an optical system is known as a technique of recovering the image quality by image processing (patent reference 1 (Japanese Patent Laid-Open No. 2001-197354) and patent reference 2 (Japanese Patent No. 03532368)). The technique using PSFs obtains a function (recovery function) for recovery based on a PSF and performs recovery processing using the recovery function. In this recovery processing, the PSF varies in accordance with the conditions of the lens type, the aperture, the focal length, the distance to the object, and the image height (the position from the optical axis center). In patent reference 1, PSFs corresponding to the respective conditions are held in advance and acquired upon image capturing to perform recovery processing. In patent reference 2, PSFs are held on concentric circles from the optical axis center and switched based on the image height of a captured image, thereby executing recovery processing.

The recovery processing will be described. Let o be the object, p be the PSF of a lens or the like, and n be noise. A captured image s obtained by an image input apparatus is expressed as $$s = o * p + n$$

where "*" represents convolution. Obtaining a recovery filter r allows to derive an object o' by $$o' = r * s$$

At this time, r is the filter associated by p and n.

In the related art, however, the enormous data amount of PSFs and the large calculation amount pose a problem. As described above, the PSF varies depending on the position in an image. Hence, for image recovery on the entire screen, it is necessary to hold PSFs for the respective positions on the whole screen. In this case, the data amount of the PSFs becomes enormous, resulting in difficulty in PSF data exchange between the lens and the camera. When a PSF is held for each concentric region, as in patent reference 2, the region boundaries pose a problem. In addition, the PSF characteristics vary depending on not only the distance from the optical axis center but also the position with reference to the optical axis center. For this reason, the concentric regions do not suffice.

On the other hand, when holding the PSFs and calculating recovery filters from the PSFs at the time of image capturing, as in patent references 1 and 2, processing such as Fourier transformation in high calculation cost is necessary, resulting in a large calculation amount.

SUMMARY OF THE INVENTION

The present invention has been made in consideration of the above problems, and provides a technique of generating a higher-quality image, by performing image processing to reduce blurs resulted from lens aberrations using data whose data amount is smaller.

According to the first aspect of the present invention, an image processing apparatus comprising: a holding unit configured to hold a filter to be used to reduce a blur at an image height position for each image height on a line from a center position of an image to an end of the image; a read unit configured to read out the filter from the holding unit; and a process unit configured to perform image quality recovery processing of reducing the blur in the image using the filter read out by the read unit, the process unit comprising: a lay-out unit configured to lay out a filter of interest to be laid out at a position of an image height of interest on the line so as to reduce a blur at the position, the filter of interest being rotated about the center position of the image by a filter layout angle; and a unit configured to apply the filter of interest laid out by the lay-out unit to the position of the image height of interest on a line obtained by rotating the line about the center position of the image by the filter layout angle, thereby performing the image quality recovery processing for the position.

According to the second aspect of the present invention, an image processing apparatus comprising: a read unit configured to read out a filter from an external device that holds the filter to be used to reduce a blur at an image height position for each image height on a line from a center position of an image to an end of the image; and a process unit configured to perform image quality recovery processing of reducing the blur in the image using the filter read out by the read unit, the process unit comprising: a lay-out unit configured to lay out a filter of interest to be laid out at a position of an image height of interest on the line so as to reduce a blur at the position, the filter of interest being rotated about the center position of the image by a filter layout angle; and a unit configured to apply the filter of interest laid out by the lay-out unit to the position of the image height of interest on a line obtained by rotating the line about the center position of the image by the filter layout angle, thereby performing the image quality recovery processing for the position.

According to the third aspect of the present invention, an image processing method to be performed by an image processing apparatus including a holding unit configured to hold a filter to be used to reduce a blur at an image height position for each image height on a line from a center position of an image to an end of the image, comprising: a read step of reading out the filter from the holding unit; and a process step of performing image quality recovery processing of reducing the blur in the image using the filter read out in the read step, the process step comprising: a lay out step of laying out a filter of interest to be laid out at a position of an image height of interest on the line so as to reduce a blur at the position, the filter of interest being rotated about the center position of the image by a filter layout angle; and a step of applying the filter of interest laid out in the lay out step to the position of the image height of interest on a line obtained by rotating the line about the center position of the image by the filter layout angle, thereby performing the image quality recovery processing for the position.

According to the fourth aspect of the present invention, an image processing method to be performed by an image processing apparatus, comprising: a read step of reading out a filter from an external device that holds the filter to be used to reduce a blur at an image height position for each image height on a line from a center position of an image to an end of the image; and a process step of performing image quality recovery processing of reducing the blur in the image using the filter read out in the read step, the process step comprising: a laying out step of laying out a filter of interest to be laid out at a position of an image height of interest on the line so as to reduce a blur at the position, the filter of interest being rotated about the center position of the image by a filter layout angle; and a step of applying the filter of interest laid out in the lay out step to the position of the image height of interest on a line obtained by rotating the line about the center position of the image by the filter layout angle, thereby performing the image quality recovery processing for the position.

Further features of the present invention will become apparent from the following description of exemplary embodiments with reference to the attached drawings.

DESCRIPTION OF THE EMBODIMENTS

An embodiment of the present invention will now be described with reference to the accompanying drawings. Note that the embodiment to be described below is an example of detailed practice of the present invention, and one of detailed examples of arrangements defined in the scope of claims.

First Embodiment

Using the symmetry of blur recovery filters to be used to reduce blurs caused by lens aberrations, an image capturing apparatus according to this embodiment holds blur recovery filters for only one image height direction in the memory (lens memory) of the lens unit detachable from the camera body. When performing processing (blur recovery processing) of reducing blurs caused by lens aberrations on the camera body side, a blur recovery filter is acquired from the lens unit, expanded, and applied to the image. This enables to perform processing of reducing blurs caused by lens aberrations for an entire image.

Figure 1:
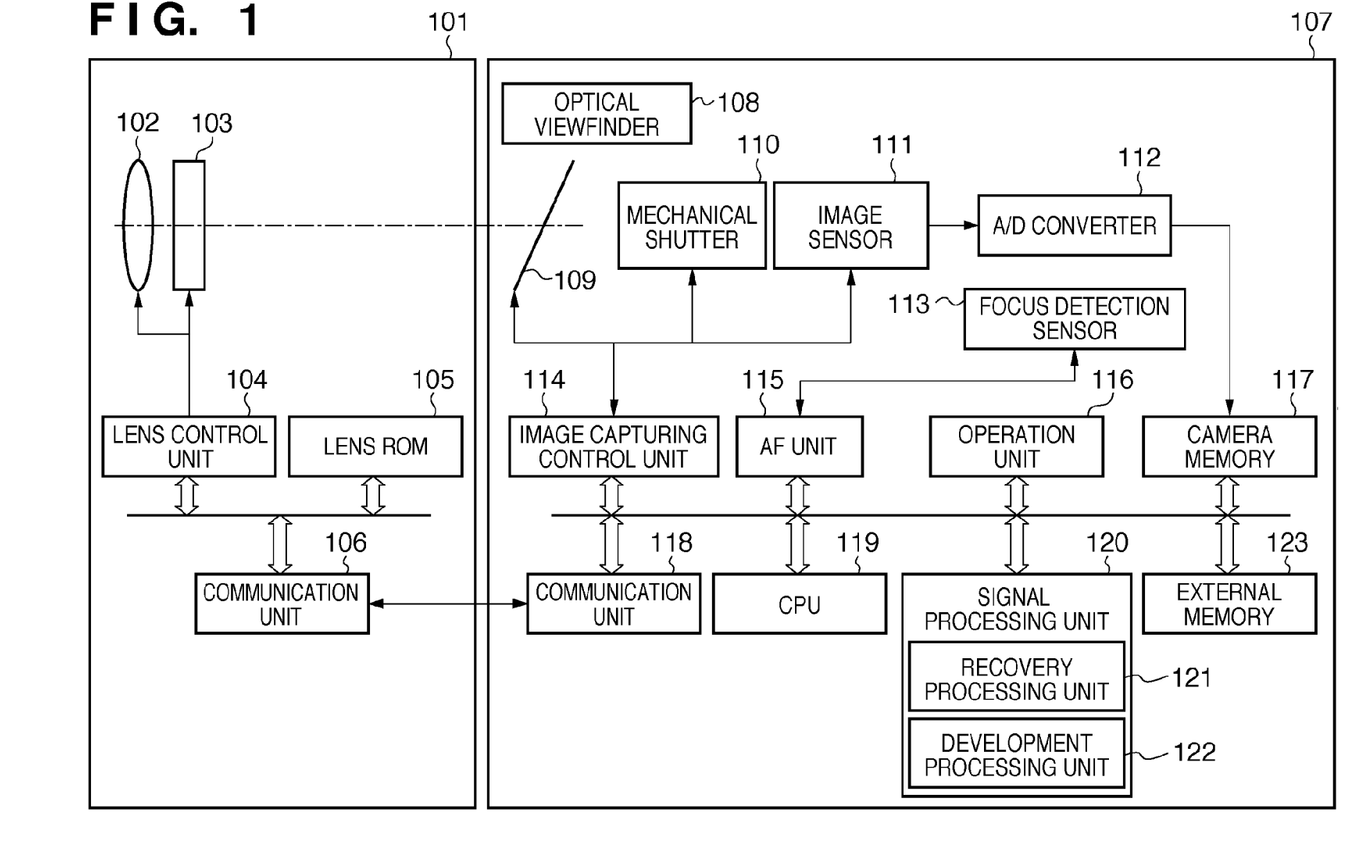
FIG. 1 is a block diagram showing an example of the arrangement of an image capturing apparatus.

The image capturing apparatus according to the embodiment will be described with reference to the block diagram of FIG. 1. As shown in FIG. 1, the image capturing apparatus according to the embodiment includes a camera body 107 and a lens unit 101 that is detachable from the camera body 107 and communicable with it.

First, the lens unit 101 will be explained. Light input via a lens 102 and an aperture 103 of the lens unit 101 enters the side of the camera body 107. A lens control unit 104 controls the lens 102 and the aperture 103.

A lens ROM (lens memory) 105 stores data to be used by the lens control unit 104 to operate, for example, the data of controlled variables of the lens 102 and the aperture 103 according to various kinds of information sent from the side of the camera body 107.

The lens ROM 105 also stores a blur recovery filter to be used to reduce a blur at an image height position for each image height on the line from the center position to an end of an image that can be captured by the image capturing apparatus of the embodiment. Note that in this embodiment, the center position of a captured image is assumed to equal the optical axis center position for the descriptive convenience. However, when the optical axis center position shifts from the center position of the captured image, the center position of the captured image is replaced with the optical axis center position in the captured image in the following description.

The blur recovery filter corresponding to each image height changes depending on the image capturing parameters such as the focal length and the aperture. Hence, the blur recovery filter corresponding to each image height is stored in the lens ROM 105 for each combination of the image capturing parameters. A communication unit 106 is used for communication with the camera body 107.

The camera body 107 will be described next. The light that has entered the side of the camera body 107 via the lens 102 and the aperture 103 enters an image sensor 111 such as a CCD or a CMOS via a mechanical shutter 110. In addition, the light that has entered the side of the camera body 107 via the lens 102 and the aperture 103 is reflected by a half mirror 109 so as to enter an optical viewfinder 108 as well.

The image sensor 111 outputs an electrical signal corresponding to the incident light as a captured image signal. An A/D converter 112 converts the captured image signal that is an analog signal into a digital signal. The captured image data that is a digital signal is stored in a camera memory 117. The camera memory 117 stores computer programs and various kinds of data to be used by a CPU 119 to execute various kinds of processing so as to control the operations of the units of the camera body 107.

An image capturing control unit 114 controls the image capturing operation by controlling the half mirror 109, the mechanical shutter 110, the image sensor 111, and the lens unit 101. An operation unit 116 forms an operation instruction unit including buttons. The user can input an image capturing instruction and image capturing parameters to the camera body 107 by operating the operation unit 116. Note that when the user has input image capturing parameters using the operation unit 116, the image capturing parameters are sent to the image capturing control unit 114 and also to the lens unit 101 via a communication unit 118. In this case, the image capturing control unit 114 controls the half mirror 109, the mechanical shutter 110, and the image sensor 111 based on the image capturing parameters. The lens control unit 104 on the side of the lens unit 101 acquires the image capturing parameters via the communication unit 106, and controls the lens 102 and the aperture 103 based on the acquired image capturing parameters.

A focus detection sensor 113 operates only in the auto focus mode to detect the focal length of the object. The information of the detected focal length is input to an AF unit 115. The AF unit 115 calculates the focus amount based on the received focal length information and sends the calculated focus amount to the image capturing control unit 114 and also to the lens unit 101 via the communication unit 118. In this case, the image capturing control unit 114 controls the half mirror 109, the mechanical shutter 110, and the image sensor 111 based on the focus amount. The lens control unit 104 on the side of the lens unit 101 controls the lens 102 and the aperture 103 based on the focus amount.

A signal processing unit 120 includes a recovery processing unit 121 and a development processing unit 122. The recovery processing unit 121 reads out captured image data stored in the camera memory 117 and performs blur recovery processing for the readout captured image. The development processing unit 122 performs development processing such as demosaicing, WB (White Balance), gamma correction, color conversion, and noise reduction for the captured image that has undergone the blur recovery processing. The development processing unit 122 then stores the captured image data having undergone the development processing in the camera memory 117 or an external memory 123. The external memory 123 formed from, for example, a compact Flash® or an SD memory is detachable from the camera body 107.

Note that the arrangement shown in FIG. 1 is merely an example, and the arrangement of the image capturing apparatus according to this embodiment is not limited to this as far as it can implement processes to be described below. FIG. 1 illustrates the major components of the image capturing apparatus according to the embodiment, and the image capturing apparatus of the embodiment includes not only the units shown in FIG. 1.

Figure 2:
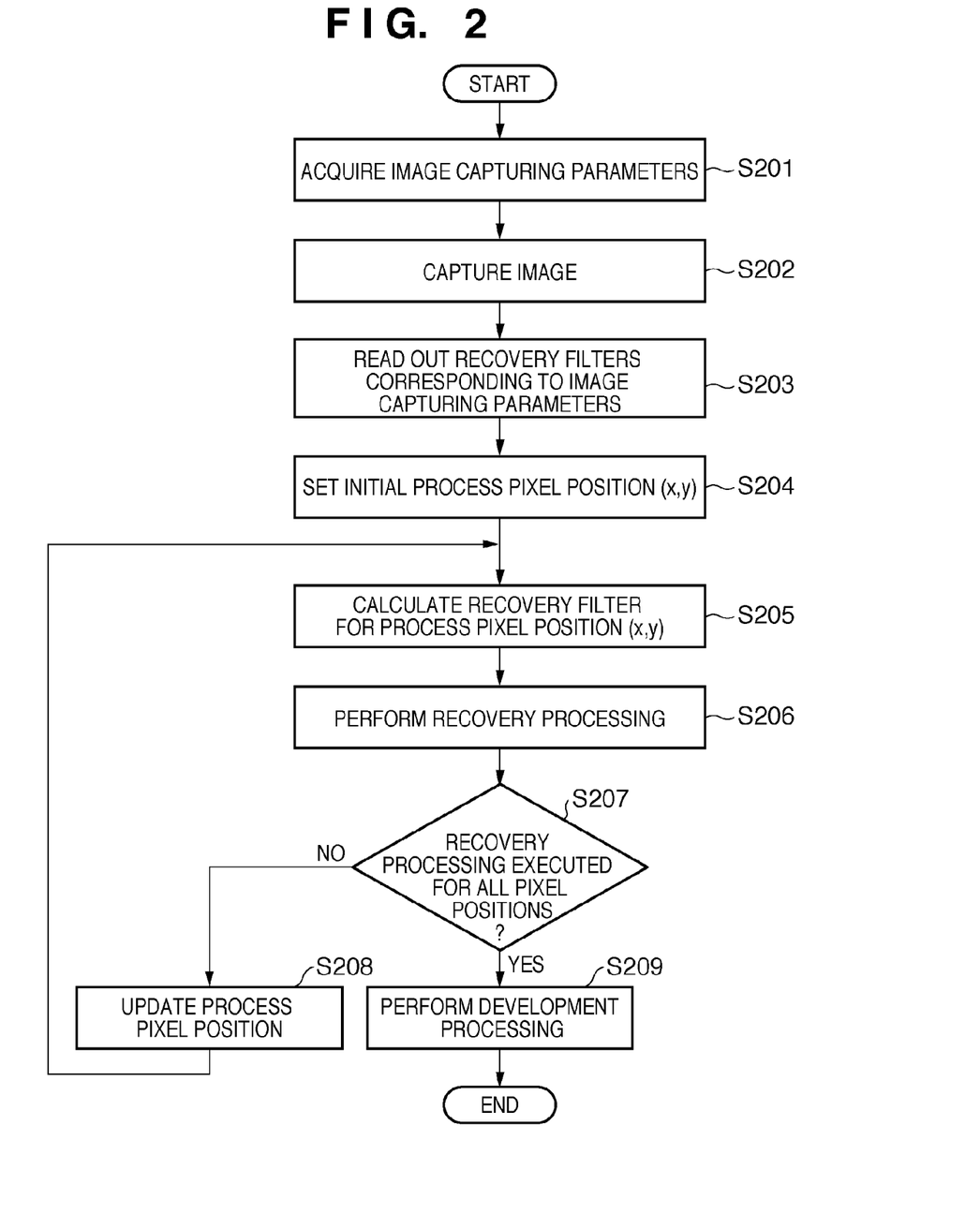
FIG. 2 is a flowchart of processing to be executed by the image capturing apparatus.

A series of processes to be executed by the image capturing apparatus of the embodiment when capturing an image and performing blur recovery processing for the captured image will be described next with reference to the flowchart of FIG. 2. First, the user sets image capturing parameters (aperture, shutter speed, focal length, ISO speed, and the like) to be used to capture the object image by operating the operation unit 116. In step S201, the CPU 119 acquires the image capturing parameters.

In step S202, the image capturing control unit 114 and the lens control unit 104 control the lens 102, the aperture 103, the mechanical shutter 110, and the like based on the image capturing parameters set in step S201 so as to expose the image sensor 111. With this exposure, captured image data is obtained via the image sensor 111 and the A/D converter 112 and stored in the camera memory 117. Note that when the user sets the auto focus mode using the operation unit 116, the focus detection sensor 113 detects the focal length to the object, and the AF unit 115 calculates the focus amount based on the detected focal length so that the focus amount is used for image capturing.

In step S203, the CPU 119 controls the communication units 118 and 106 to read out, from the lens ROM 105, blur recovery filters corresponding to the image capturing parameters acquired in step S201 and store the blur recovery filters in the camera memory 117. The processing of this step will be described later in detail.

In step S204, the recovery processing unit 121 reads out, from the camera memory 117, the data of the captured image (process target image) to be subjected to blur recovery processing. The recovery processing unit 121 then sets a blur recovery processing target position (x,y) on the process target image.

In step S205, the recovery processing unit 121 creates a blur recovery filter to be applied to the position (x,y) using the blur recovery filters read out in step S203. The processing of this step will be described later in detail.

In step S206, the recovery processing unit 121 performs convolution for the position (x,y) using the blur recovery filter created in step S205, thereby performing blur recovery processing for the position.

In step S207, the recovery processing unit 121 determines whether the blur recovery processing has been done for all pixel positions on the captured image. If YES, the process advances to step S209, and otherwise, the process advances to step S208.

In step S209, the development processing unit 122 performs the above-described development processing for the captured image that has undergone the blur recovery processing in the above steps, and stores the captured image data after the development processing in the camera memory 117 or the external memory 123.

On the other hand, in step S208, the recovery processing unit 121 sets a position yet to undergo the blur recovery processing by shifting the pixel position (x,y) (for example, incrementing x by one). The blur recovery processing is performed for the set position from step S205.

Figure 3:
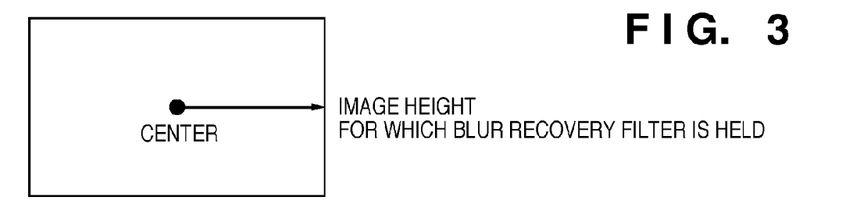
FIG. 3 is a view for explaining blur recovery filters.

The blur recovery filter will be explained next in more detail. An aberration of an optical system is generally point-symmetric with respect to the optical axis center. Hence, the blur recovery filters to be applied to the positions on the image also have a point-symmetric arrangement with respect to the image center (optical axis center). In this embodiment, circumventing holding blur recovery filters for all image heights of an image that can be captured by the image capturing apparatus, blur recovery filters to be applied to the respective image heights from the image center position to one end of the image are held, as shown in FIG. 3. A description will be made below assuming that blur recovery filters are held in correspondence with the image heights on one horizontal line from the center position of the captured image to the right end of the captured image. However, the following description is similarly applicable regardless of the position of the end of the one line from the center position of the captured image.

Figure 4A:
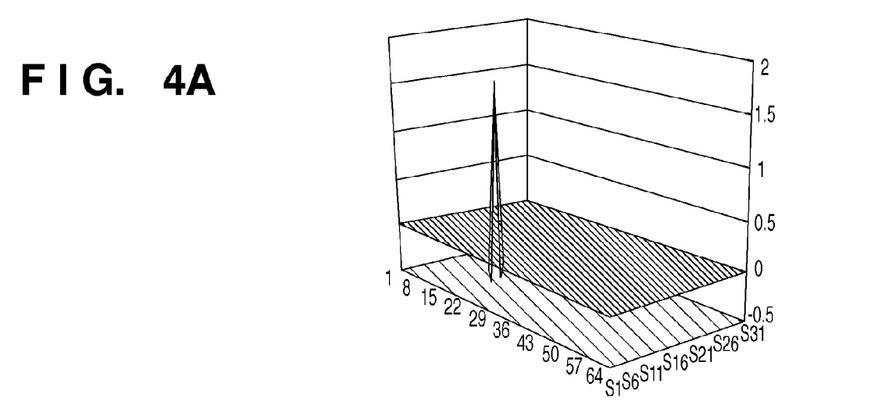
FIGS. 4A and 4B are graphs showing examples of the blur recovery filters.
Figure 4B:
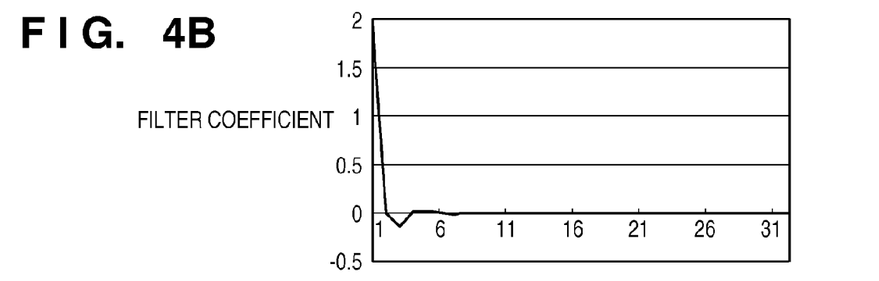

FIGS. 4A and 4B show examples of the blur recovery filters stored in the lens ROM 105. FIG. 4A three-dimensionally illustrates coefficient values in the blur recovery filters. FIG. 4B shows one section. Only half of the blur recovery filters to the optical axis center is held using the point symmetry of aberrations, as described above, thereby decreasing the data amount. Concerning image heights in, for example, the horizontal (or vertical) direction, the vertical (or horizontal) half of the filters is held. The remaining filters can be obtained by calculation. Recovery filters at positions of ±45° or ±135° with respect to the optical axis center are line-symmetric with respect to the optical axis center, and only half of them is held.

Figure 5:
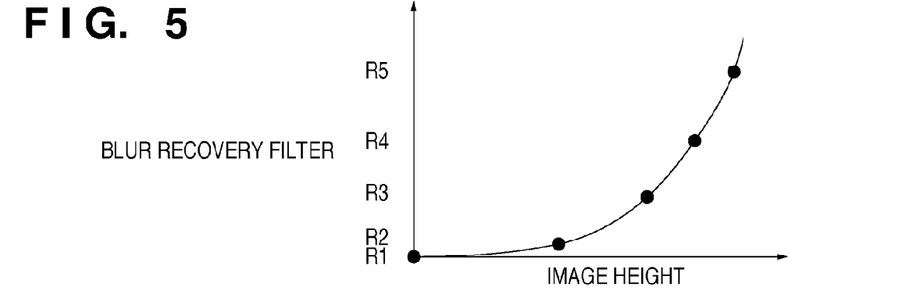
FIG. 5 is a graph for explaining the blur recovery filters.

In general, an aberration of the optical system smoothly varies in one image height direction. As shown in FIG. 5, blur recovery filters are held in correspondence with discrete image heights. Blur recovery filters between them can be obtained by interpolation. However, the higher the image height is, the larger the degree of variation is. Hence, as the image height increases, corresponding blur recovery filters are held at narrower image height intervals.

Figure 6:
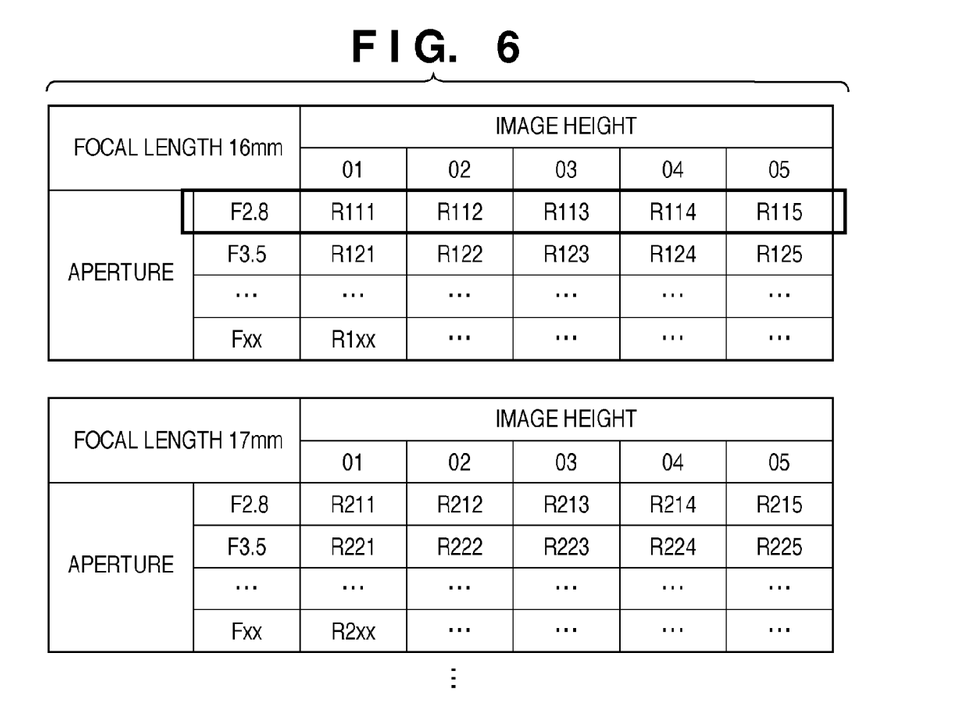
FIG. 6 is a view showing an example of the arrangement of a table that manages the blur recovery filters.

As described above, the blur recovery filter corresponding to each image height changes depending on the image capturing parameters such as the focal length and the aperture. Hence, the blur recovery filter corresponding to each image height is stored in the lens ROM 105 for each combination of the image capturing parameters. FIG. 6 shows an example of the arrangement of a table that manages the blur recovery filters for each combination of the focal length and the aperture.

Assume that the user sets focal length=16 mm and aperture value F=2.8 using the operation unit 116. In this case, blur recovery filters R111 to R115 corresponding to image heights 01 to 05, respectively, are read out from the lens ROM 105 in step S203.

Processing of step S205, that is, processing of creating a blur recovery filter to be applied to the pixel position (x,y) using the blur recovery filters read out in step S203 will be described next. For the descriptive convenience, the blur recovery filters read out in step S203 are assumed to be blur recovery filters 1 to N (N>1) respectively corresponding to image heights 1 to N on the one horizontal line.

First, blur recovery filters corresponding to positions between the image heights are created. This can be done by interpolation calculation between adjacent blur recovery filters. For example, a blur recovery filter corresponding to the position between image heights 2 and 3 can be obtained by interpolation calculation using blur recovery filter 2 (first filter) and blur recovery filter 3 (second filter). Bilinear interpolation, bicubic interpolation, nonlinear interpolation, or the like is applicable to the interpolation calculation.

Figure 7:
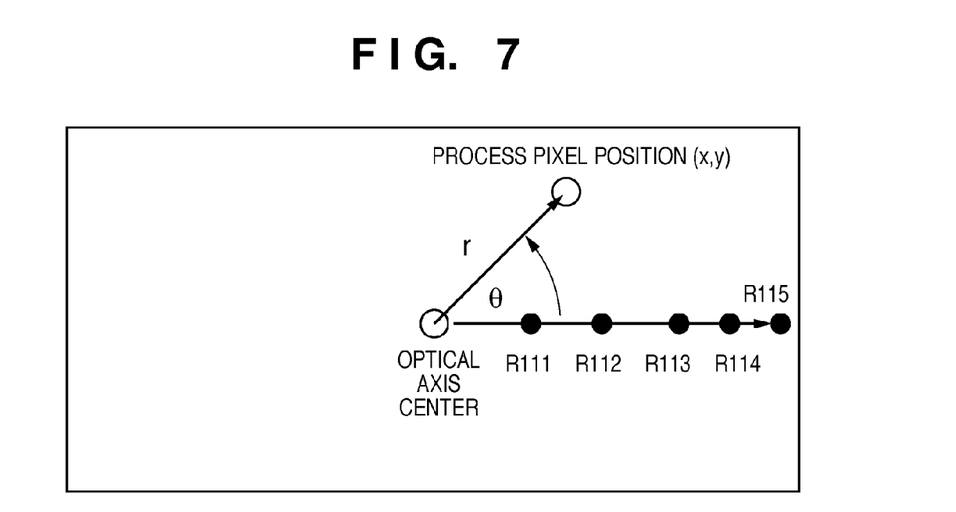
FIG. 7 is a view for explaining a method of creating the blur recovery filters.

This allows to create blur recovery filters corresponding to the pixel positions on one horizontal line. Next, as shown in FIG. 7, the angle made by the one horizontal line and a line r passing through the center position of the captured image and the position (x,y) (the angle counterclockwise from the one horizontal line) is defined as θ. In this case, the blur recovery filters (R111 to R115 in FIG. 7) for the pixel positions on the one horizontal line are rotated by θ about the center position of the captured image. This enables to create blur recovery filters corresponding to the pixel positions on the line r. The blur recovery filter to be applied to the position (x,y) on the line is thus obtained, as a matter of course. Hence, the blur recovery filter obtained for the position (x,y) can be applied to the position (x,y).

The processing of step S205 will be summarized below. First, defining a line from the center position of an image that can be captured by the image capturing apparatus to one end of the image, a filter of interest to be laid out at the position of an image height of interest on that line and used to reduce blurs at this position is laid out after being rotated about the center position of the image by the filter layout angle. The filter layout angle is determined by, for example, the size and resolution of the sensor, the optical characteristics (focal length and aperture) of the image capturing apparatus, and the required accuracy of image quality recovery processing. The filter layout angle may be set either in advance or dynamically in accordance with conditions upon image capturing or user inputs.

The line is rotated about the center position of the image by the filter layout angle. The filter of interest laid out is applied to the position of the image height of interest on the rotated line, thereby performing image quality recovery processing for that position.

As described above, according to the embodiment, it is possible to generate a higher-quality image by performing image processing to reduce blurs resulted from lens aberrations while making the data amount of blur recovery filters smaller than before.

Second Embodiment

Figure 8:
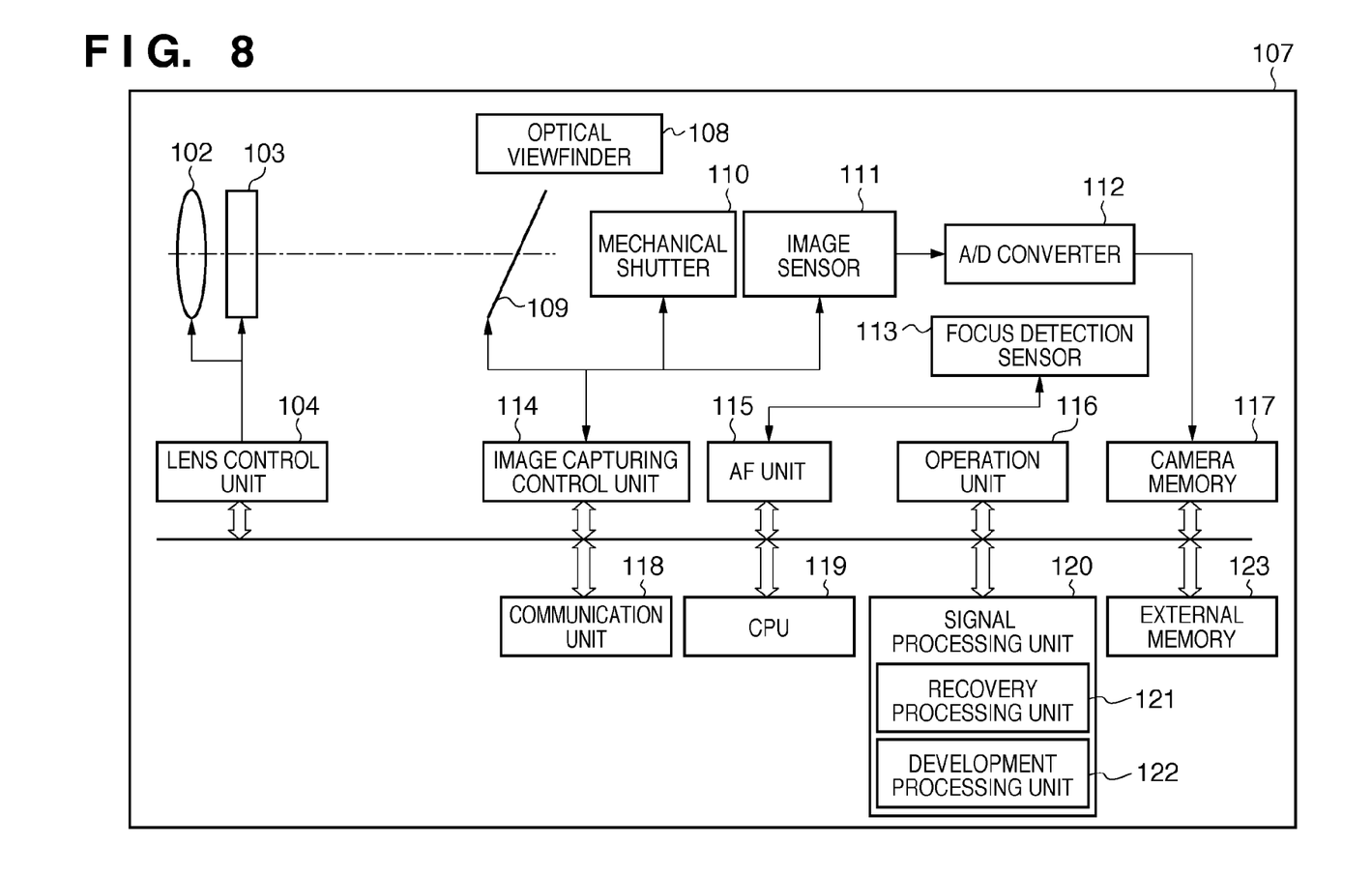
FIG. 8 is a block diagram showing an example of the arrangement of an image capturing apparatus.

In the first embodiment, the lens unit 101 is a device separated from the camera body 107. However, an image capturing apparatus in which the lens unit 101 is integrated with the camera body 107 can also be considered. FIG. 8 shows an example of the arrangement of an image capturing apparatus in which a lens unit 101 is integrated with a camera body 107. In this case, blur recovery filters corresponding to the respective image heights for image capturing parameters are stored in a camera memory 117, although they are stored in the lens ROM 105 in the above-described embodiment. Note that the second embodiment is the same as the first embodiment except this point.

Third Embodiment

In the first and second embodiments, a case has been described in which image quality recovery processing is implemented by the image capturing apparatus. However, the image quality recovery processing can be implemented by any apparatus other than the image capturing apparatus if it can acquire and process an image. In this embodiment, an example will be described in which application software for implementing the image quality recovery processing is installed in an image processing apparatus such as a PC (Personal Computer) so that the image processing apparatus implements the above-described image quality recovery processing by executing the application.

Figure 9:
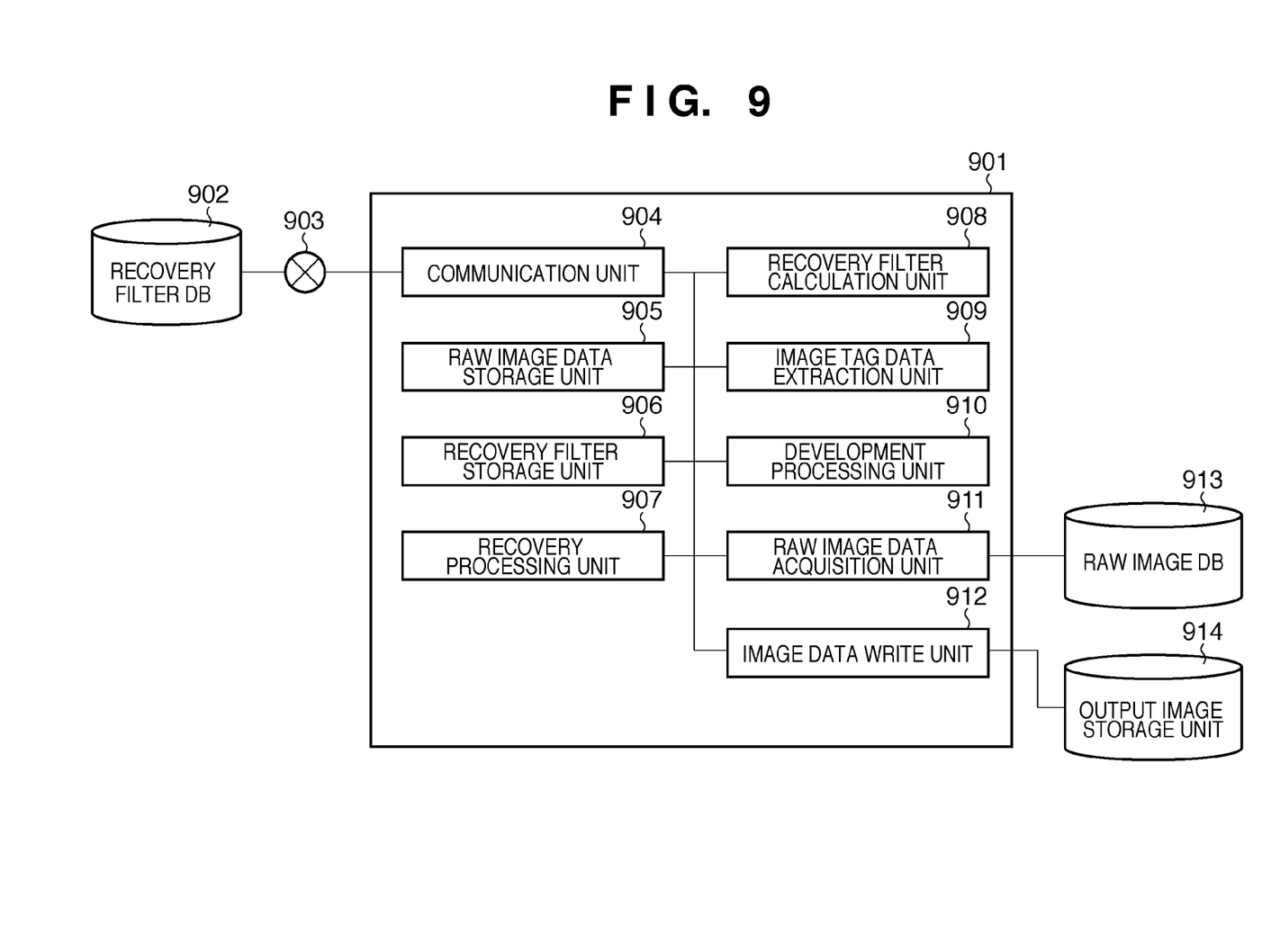
FIG. 9 is a block diagram showing an example of the arrangement of an image processing apparatus.

An example of the functional arrangement of the image processing apparatus according to this embodiment will be described first with reference to the block diagram of FIG. 9. A recovery filter DB (database) 902 is connected to an image processing apparatus 901 via a network 903. The image processing apparatus 901 communicates with the recovery filter DB 902 using a communication unit 904. The network 903 may be either the Internet or an intranet, and either a wireless network or a wired network.

The recovery filter DB 902 stores a blur recovery filter to be used to reduce a blur at an image height position for each image height on the line from the center position of an image to an end of the image. Note that the blur recovery filter corresponding to each image height changes depending on image capturing parameters such as the focal length and the aperture and is therefore stored in the recovery filter DB 902 for each combination of the image capturing parameters, as in the first embodiment.

A RAW image DB 913 in which a plurality of image data (RAW image data) are registered and an output image storage unit 914 configured to store image data that has undergone development processing in a development processing unit 910 are connected to the image processing apparatus 901. Both the RAW image DB 913 and the output image storage unit 914 are formed from a storage device such as a hard disk that functions as an external storage device.

A RAW image data storage unit 905 is formed from a RAM, a hard disk, or the like to temporarily store the RAW image data that a RAW image data acquisition unit 911 has read out from the RAW image DB 913.

A recovery filter storage unit 906 is formed from a RAM, a hard disk, or the like to temporarily store blur recovery filter data that the communication unit 904 has read out from the recovery filter DB 902.

A recovery processing unit 907 performs image quality recovery processing for an image using blur recovery filters. A recovery filter calculation unit 908 generates a blur recovery filter for an application target position using the blur recovery filters that the communication unit 904 has acquired from the recovery filter DB 902.

An image tag data extraction unit 909 extracts the image capturing parameters (focal length, aperture, object distance, and the like) of the image from tag data attached to the RAW image data that the RAW image data acquisition unit 911 has read out from the RAW image DB 913. That is, the communication unit 904 reads out, from the recovery filter DB 902, blur recovery filters corresponding to the image capturing parameters extracted from the tag data.

The development processing unit 910 performs development processing such as demosaicing, WB (White Balance), gamma correction, color conversion, and noise reduction for the image that has undergone the image quality recovery processing in the recovery processing unit 907. An image data write unit 912 writes, in the output image storage unit 914, the image data that has undergone the development processing in the development processing unit 910.

Note that the recovery processing unit 907, the recovery filter calculation unit 908, the image tag data extraction unit 909, the development processing unit 910, the RAW image data acquisition unit 911, and the image data write unit 912 function as the functional units of a CPU 119. The communication unit 904 functions as a network interface circuit.

Figure 10:
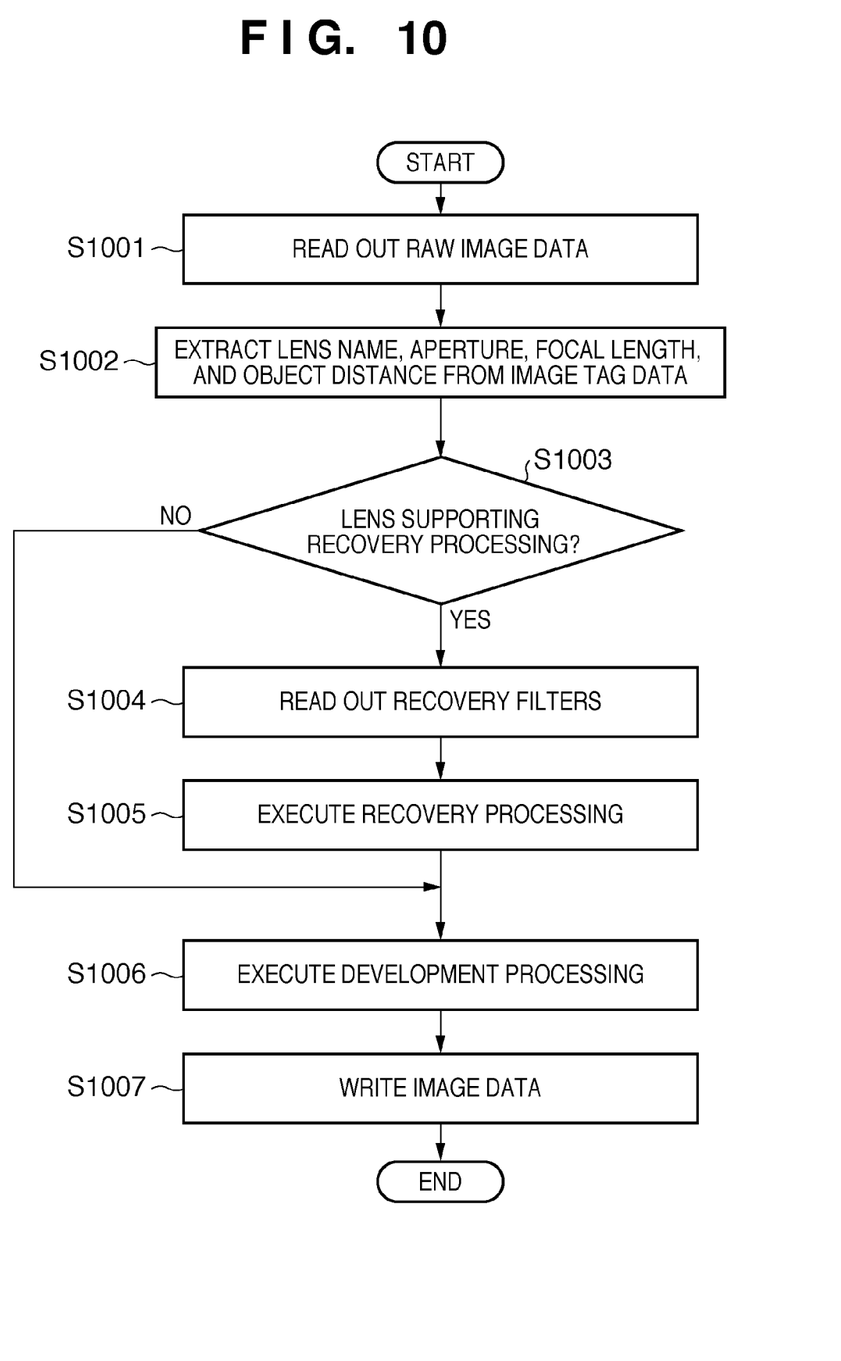
FIG. 10 is a flowchart of processing to be executed by the image processing apparatus.

Processing to be executed by the image processing apparatus 901 will be described next with reference to the flowchart of FIG. 10. In step S1001, the RAW image data acquisition unit 911 reads out process target RAW image data from the RAW image DB 913 and stores it in the RAW image data storage unit 905.

In step S1002, the image tag data extraction unit 909 extracts image capturing parameters from tag data attached to the RAW image data read out in step S1001. If lens name information in the extracted image capturing parameters represents a lens capable of blur recovery processing, the process advances to step S1004 via step S1003. If the information does not represent a lens capable of blur recovery processing, the processing ends.

In step S1004, the communication unit 904 reads out, from the recovery filter DB 902, blur recovery filters corresponding to the image capturing parameters extracted in step S1002 and stores them in the recovery filter storage unit 906.

In step S1005, the recovery processing unit 907 performs the same operation as that of the recovery processing unit 121 for the RAW image data read out in step S1001 using the blur recovery filters read out in step S1004. The image quality recovery processing described in the first embodiment is thus implemented.

In step S1006, the development processing unit 910 performs development processing for the RAW image data that has undergone the image quality recovery processing in step S1005. In step S1007, the image data write unit 912 stores the RAW image data that has undergone the development processing in step S1006 in the output image storage unit 914. Note that the image data write unit 912 may store the RAW image data that has undergone the development processing in the output image storage unit 914 after compressing the data using a compression technique such as TIFF or JPEG.

Fourth Embodiment

Another embodiment of the image processing apparatus according to the third embodiment will be described. This embodiment is the same as in the third embodiment except the point to be described below. Processing to be executed by the image processing apparatus according to this embodiment will be described with reference to the flowchart of FIG. 11. In step S1101, a RAW image data acquisition unit 911 reads out process target RAW image data from a RAW image DB 913 and stores it in a RAW image data storage unit 905.

Figure 11:
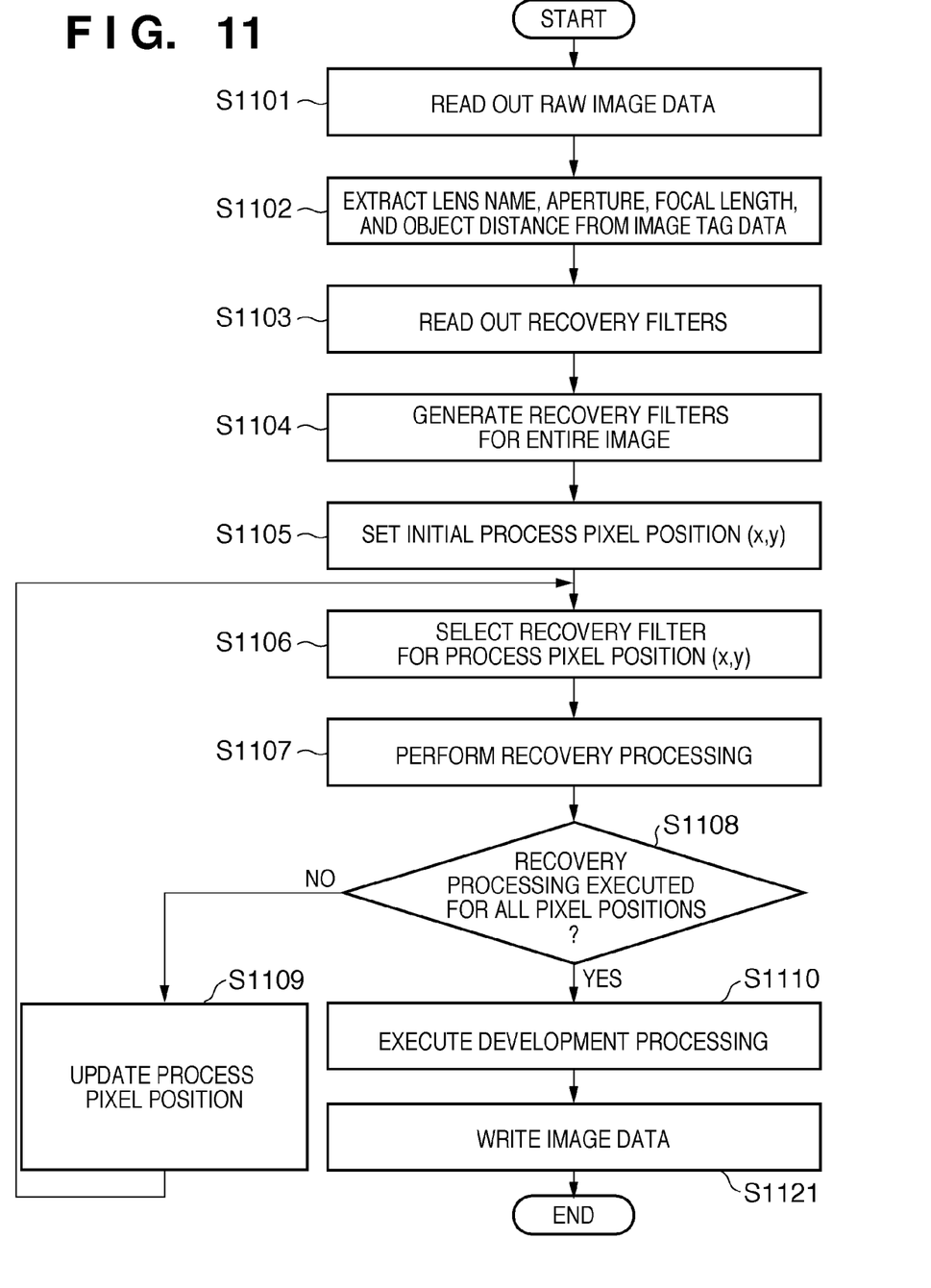
FIG. 11 is a flowchart of processing to be executed by the image processing apparatus.

In step S1102, an image tag data extraction unit 909 extracts image capturing parameters from tag data attached to the RAW image data read out in step S1101.

In step S1103, a communication unit 904 reads out, from a recovery filter DB 902, blur recovery filters corresponding to the image capturing parameters extracted in step S1102 and stores them in a recovery filter storage unit 906.

In step S1104, a recovery processing unit 907 creates blur recovery filters for the entire screen of the RAW image data read out in step S1101 using the blur recovery filters read out in step S1103. The processing of this step will be described later in detail.

In step S1105, the recovery processing unit 907 sets an initial position (x,y) of the blur recovery processing target position on the RAW image data. In step S1106, the recovery processing unit 907 selects a blur recovery filter to be applied to the process target position (x,y) from the blur recovery filters created in step S1104. The processing of this step will be described later in detail.

In step S1107, the recovery processing unit 907 performs convolution for the position (x,y) using the blur recovery filter selected in step S1106, thereby performing blur recovery processing for the position.

In step S1108, the recovery processing unit 907 determines whether the blur recovery processing has been done for all pixel positions on the captured image. If YES, the process advances to step S1110, and otherwise, the process advances to step S1109.

In step S1110, a development processing unit 910 performs development processing for the RAW image data that has undergone the image quality recovery processing in step S1107. In step S1121, an image data write unit 912 stores the RAW image data that has undergone the development processing in step S1110 in an output image storage unit 914. Note that the image data write unit 912 may store the RAW image data that has undergone the development processing in the output image storage unit 914 after compressing the data using a compression technique such as TIFF or JPEG.

On the other hand, in step S1109, the recovery processing unit 907 sets a position yet to undergo the blur recovery processing by shifting the pixel position (x,y) (for example, incrementing x by one). The blur recovery processing is performed for the set position from step S1106.

Details of the processing of step S1104 will be described next. In the first to third embodiments, since a blur recovery filter is created for each pixel, the calculation cost is relatively high. In the fourth embodiment, a captured image is divided into regions, and a single blur recovery filter is applied within a single divided region in relation to the nature of image degradation and the image quality recovery effect by blur recovery filters. Since the number of blur recovery filters to be obtained is smaller than in the first to third embodiments, the calculation cost can be reduced as compared to the first to third embodiments. Note that the method of creating a filter for a position in a given region is the same as in the first embodiment.

Figure 12:
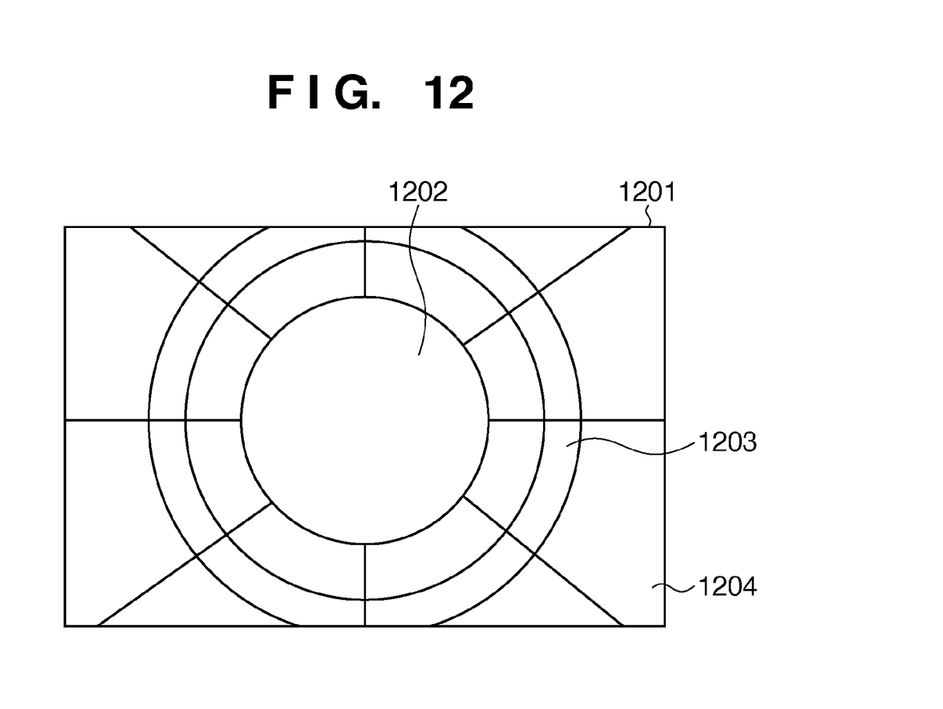
FIG. 12 is a view showing an example of division of a captured image.

FIG. 12 illustrates an example of division of a captured image. In FIG. 12, a captured image 1201 is divided into a center image height region 1202, a medium image height region 1203, and a high image height region 1204. Degradation caused by an optical system such as a lens is generally known to be smaller at the center of the captured image and larger as the image height increases. On the other hand, image quality recovery processing using blur recovery filters is accompanied with an increase in noise. Hence, when the image quality recovery processing is performed in all regions of a captured image, the noise increase amount is smaller at the center of the captured image but larger for a higher image height.

It is therefore necessary to suppress the noise increase amount to a predetermined amount in all regions of the captured image. With this processing, the center portion of the captured image where degradation is small by nature undergoes not so intense image quality recovery. The medium image height portion undergoes sufficient recovery. On the other hand, the high image height portion undergoes not so intense recovery processing. Considering these characteristics, applying a single blur recovery filter to the center portion of the captured image suffices independently of the pixel position. On the other hand, the medium image height portion needs a blur recovery filter that variously changes depending on the pixel position. The high image height portion requires a blur recovery filter that does not so largely change depending on the pixel position.

In consideration of these characteristics, the center portion of the captured image is coarsely divided into regions, the medium image height portion is more finely divided as the image height increases, and the high image height portion is coarsely divided into regions, as shown in FIG. 12.

Figure 13:
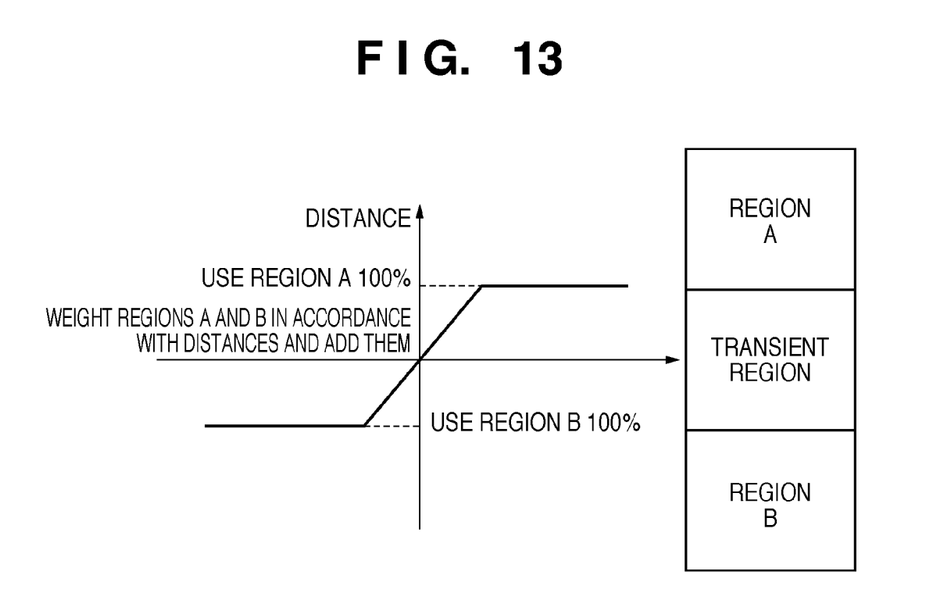
FIG. 13 is a view for explaining a switching region.

Details of the processing of step S1106 will be described next. In this embodiment, a single blur recovery filter is used within a single divided region, as described above. In a region where the blur recovery filter switches, however, since the characteristics of the blur recovery filter change, a break occurs. In this embodiment, a transient region is provided for a switching region, as shown in FIG. 13. In FIG. 13, a blur recovery filter to be used at a position between a region A and a region B is created by combining the filter used in the region A and that used in the region B at a ratio corresponding to the distance from the region A to that position and the distance from the region B to that position. This allows to reduce breaks in the region switching region.

In the above-described examples, the blur recovery filters are held. Instead, the blur recovery filters may be Fourier-transformed and held as frequency responses. In this case, the above-described rotation and expansion are done in the frequency domain, and inverse Fourier transformation is performed at last, thereby calculating the blur recovery filters.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-151435 filed Jul. 1, 2010 which is hereby incorporated by reference herein in its entirety.

What is claimed is:

1. An image processing apparatus comprising:
a holding unit configured to hold a filter to be used to reduce a blur at an image height position for each image height on a line from a center position of an image to an end of the image;
a read unit configured to read out the filter from said holding unit; and
a process unit configured to perform image quality recovery processing of reducing the blur in the image using the filter read out by said read unit,
said process unit comprising:
a lay-out unit configured to lay out a filter of interest to be laid out at a position of an image height of interest on the line so as to reduce a blur at the position, the filter of interest being rotated about the center position of the image by a filter layout angle; and
a unit configured to apply the filter of interest laid out by said lay-out unit to the position of the image height of interest on a line obtained by rotating the line about the center position of the image by the filter layout angle, thereby performing the image quality recovery processing for the position.

2. The apparatus according to claim 1, wherein said holding unit holds the filters at narrower image height intervals as the image height from the center position of the image increases.

3. The apparatus according to claim 1, wherein when, out of the filters held by said holding unit, filters to be applied to positions of adjacent image heights are defined as a first filter and a second filter, said process unit obtains, by interpolation calculation using the first filter and the second filter, a filter corresponding to each position between the position of the image height where the first filter is applied and the position of the image height where the second filter is applied.

4. The apparatus according to claim 1, further comprising a unit configured to acquire the image by image capturing.

5. An image processing apparatus comprising:
a read unit configured to read out a filter from an external device that holds the filter to be used to reduce a blur at an image height position for each image height on a line from a center position of an image to an end of the image; and
a process unit configured to perform image quality recovery processing of reducing the blur in the image using the filter read out by said read unit,
said process unit comprising:
a lay-out unit configured to lay out a filter of interest to be laid out at a position of an image height of interest on the line so as to reduce a blur at the position, the filter of interest being rotated about the center position of the image by a filter layout angle; and
a unit configured to apply the filter of interest laid out by said lay-out unit to the position of the image height of interest on a line obtained by rotating the line about the center position of the image by the filter layout angle, thereby performing the image quality recovery processing for the position.

6. An image processing method to be performed by an image processing apparatus including a holding unit configured to hold a filter to be used to reduce a blur at an image height position for each image height on a line from a center position of an image to an end of the image, comprising:
a read step of reading out the filter from the holding unit; and a process step of performing image quality recovery processing of reducing the blur in the image using the filter read out in the read step, the process step comprising:

a lay out step of laying out a filter of interest to be laid out at a position of an image height of interest on the line so as to reduce a blur at the position, the filter of interest being rotated about the center position of the image by a filter layout angle; and a step of applying the filter of interest laid out in the lay out step to the position of the image height of interest on a line obtained by rotating the line about the center position of the image by the filter layout angle, thereby performing the image quality recovery processing for the position.

7. An image processing method to be performed by an image processing apparatus, comprising:

a read step of reading out a filter from an external device that holds the filter to be used to reduce a blur at an image height position for each image height on a line from a center position of an image to an end of the image; and a process step of performing image quality recovery processing of reducing the blur in the image using the filter read out in the read step, the process step comprising:

a laying out step of laying out a filter of interest to be laid out at a position of an image height of interest on the line so as to reduce a blur at the position, the filter of interest being rotated about the center position of the image by a filter layout angle; and a step of applying the filter of interest laid out in the lay out step to the position of the image height of interest on a line obtained by rotating the line about the center position of the image by the filter layout angle, thereby performing the image quality recovery processing for the position.

8. A non-transitory computer-readable storage medium storing a computer program that causes a computer to function as each unit provided in an image processing apparatus of claim 1.

* * * * *